United States Patent
Ruiter et al.

(10) Patent No.: US 9,116,168 B2
(45) Date of Patent: Aug. 25, 2015

(54) LOW DRIFT SCANNING PROBE MICROSCOPE

(71) Applicant: Bruker Nano, Inc., Santa Barbara, CA (US)

(72) Inventors: Anthonius G. Ruiter, Goleta, CA (US); Henry Mittel, San Ramon, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 14/520,021

(22) Filed: Oct. 21, 2014

(65) Prior Publication Data

US 2015/0074859 A1   Mar. 12, 2015

Related U.S. Application Data

(63) Continuation of application No. 13/052,901, filed on Mar. 21, 2011, now Pat. No. 8,869,310.

(60) Provisional application No. 61/315,580, filed on Mar. 19, 2010.

(51) Int. Cl.
    G01Q 30/10    (2010.01)
    B82Y 35/00    (2011.01)
    G01Q 70/04    (2010.01)

(52) U.S. Cl.
    CPC .............. *G01Q 30/10* (2013.01); *B82Y 35/00* (2013.01); *G01Q 70/04* (2013.01)

(58) Field of Classification Search
    None
    See application file for complete search history.

(56) References Cited

U.S. PATENT DOCUMENTS

| 1,331,018 | A | * | 2/1920 | Luthy | 429/143 |
| 1,528,589 | A | * | 3/1925 | Tischer | 74/552 |
| 2,007,082 | A | * | 7/1935 | Griffith | 362/112 |
| 2,014,102 | A | * | 9/1935 | Conklin | 324/123 R |
| 5,077,473 | A | * | 12/1991 | Elings et al. | 850/1 |
| 5,081,390 | A | | 1/1992 | Elings | |
| 5,148,026 | A | * | 9/1992 | Watanabe et al. | 850/1 |
| 5,258,920 | A | * | 11/1993 | Haller et al. | 716/130 |
| 5,371,365 | A | * | 12/1994 | Watanabe et al. | 850/1 |

(Continued)

FOREIGN PATENT DOCUMENTS

| JP | 08184600 | 7/1996 | |
| JP | 08184600 | A * 7/1996 | G01N 37/00 |

(Continued)

OTHER PUBLICATIONS

Supplemental EP Search Report, dated Nov. 27, 2014, from EP 11 75 7128 (corresponding EP application of parent US application).

*Primary Examiner* — Andrew Smyth
(74) *Attorney, Agent, or Firm* — Boyle Fredrickson S.C.

(57) ABSTRACT

A scanning probe microscope, such as an atomic force microscope, and method including z-stage and a bridge structure. A scanner containing a probe is mounted to the z-stage, which is movable in the z-axis to raise and lower the probe. The method reduces thermal drift of the z-stage and the bridge using a combination of heating elements thermally coupled to the z-stage and the bridge, ambient temperature sensors, and a controller to actively control the heating elements to maintain the bridge and the z-stage at an elevated temperature. Ideally, the temperatures in the system are selected so as to reduce drift between the probe and the sample during AFM scanning, wherein the drift is preferably maintained at less than about 1 nm for an ambient temperature change of about 1° C.

11 Claims, 8 Drawing Sheets

(56) References Cited

U.S. PATENT DOCUMENTS

| | | | |
|---|---|---|---|
| 5,441,343 A * | 8/1995 | Pylkki et al. | 374/137 |
| 5,627,815 A * | 5/1997 | Koyanagi et al. | 369/126 |
| 5,750,989 A * | 5/1998 | Lindsay et al. | 850/14 |
| 5,821,545 A * | 10/1998 | Lindsay et al. | 250/443.1 |
| 5,929,438 A * | 7/1999 | Suzuki et al. | 850/50 |
| 6,185,992 B1 * | 2/2001 | Daniels et al. | 73/105 |
| 6,196,061 B1 * | 3/2001 | Adderton et al. | 73/105 |
| 6,279,389 B1 * | 8/2001 | Adderton et al. | 73/105 |
| 6,288,391 B1 * | 9/2001 | Ushioda et al. | 850/4 |
| 6,389,886 B2 * | 5/2002 | Daniels et al. | 73/105 |
| 6,608,307 B1 | 8/2003 | Baur | |
| 6,734,426 B2 * | 5/2004 | Matsuzaki et al. | 850/2 |
| 6,871,527 B2 * | 3/2005 | Hansma et al. | 73/105 |
| 7,076,996 B2 * | 7/2006 | Markakis et al. | 73/105 |
| 7,259,372 B2 * | 8/2007 | Takaoka et al. | 250/309 |
| 7,703,314 B2 * | 4/2010 | Abe et al. | 73/105 |
| 7,748,260 B2 * | 7/2010 | Su et al. | 73/105 |
| 7,913,544 B1 * | 3/2011 | Chand | 73/105 |
| 7,963,153 B2 * | 6/2011 | Wang et al. | 73/105 |
| 2002/0162960 A1 * | 11/2002 | Knauss et al. | 250/306 |
| 2003/0010928 A1 * | 1/2003 | Matsuzaki et al. | 250/443.1 |
| 2004/0083799 A1 * | 5/2004 | Markakis et al. | 73/105 |
| 2005/0263700 A1 * | 12/2005 | Takaoka et al. | 250/309 |
| 2006/0237639 A1 * | 10/2006 | Kley | 250/234 |
| 2007/0272005 A1 * | 11/2007 | Abe et al. | 73/105 |
| 2008/0121813 A1 * | 5/2008 | Young | 250/442.11 |
| 2009/0139315 A1 * | 6/2009 | Wang et al. | 73/105 |
| 2010/0107284 A1 * | 4/2010 | Shigeno et al. | 850/5 |

FOREIGN PATENT DOCUMENTS

| | | |
|---|---|---|
| JP | 2003207433 | 7/2003 |
| JP | 2004286696 | 10/2004 |
| JP | 2008209238 | 9/2008 |

* cited by examiner

LOW DRIFT SCANNING PROBE MICROSCOPE

CROSS-REFERENCE TO RELATED APPLICATIONS

This application is a continuation of U.S. application Ser. No. 13/052,901, filed Mar. 21, 2011 and issued as U.S. Pat. No. 8,869,310, which claims the benefit of U.S. Provisional Application No. 61/315,580, filed Mar. 19, 2010, both entitled Low Drift Scanning Probe Microscope.

FIELD OF THE INVENTION

The present invention relates generally to microscopy and, more particularly, to a method of reducing drift in a scanning probe-based instrument, such as a scanning probe microscope (SPM), employing materials susceptible to drift.

BACKGROUND OF THE INVENTION

Scanning Probe Microscopes (SPMs) are instruments that provide high resolution information about the properties of surfaces. Scanning Probe Microscopes are commonly used for imaging, with some SPMs being able to image individual atoms. Along with images, SPMs can be used to measure a variety of surface properties, with detail over the range from a few angstroms to hundreds of microns. For many applications, SPMs can provide both lateral and vertical resolution that is not generally obtainable from any other type of device.

One type of SPM is the atomic force microscope (AFM), which scans a sharp tip across a surface. The tip is mounted on the free end of a cantilever (lever). The tip is brought to a surface and the force interaction of the tip with the surface causes the cantilever to deflect. The deflection of the cantilever is measured and the position of the tip or sample can be used to adjust the vertical position of the tip as it is scanned so that the deflection, and thus the force, is kept substantially constant. The tip vertical position versus horizontal scan provides the topographic surface map. In AFM, the tip-sample interaction forces can be made very small, so small as not to deform biological molecules. Atomic force microscopes can also be operated in a non-contact mode where the repulsive force deflects the cantilever as it scans the surface. The deflection of the tip as it is scanned provides topographic information about the surface.

Atomic force microscopes are able to detect the small movements of the cantilever. Several techniques for cantilever motion detection have been used with the most common method employing reflected light from the cantilever. The deflection of a light beam due to the cantilever motion may be detected, or the movement of the cantilever can be used to generate interference effects which can be used to derive the motion. Atomic force microscopes can be used to image individual atoms as well as for measuring mechanical properties of the sample such as stiffness.

Probing devices have been developed for measuring such properties as electric field, magnetic field, photon excitation, capacitance, and ionic conductance. Whatever the probing mechanism, most SPMs have common characteristics, typically operating on an interaction between probe and surface that is confined to a very small lateral area and is extremely sensitive to vertical position. Most SPMs are able to position a probe very accurately in three dimensions and use high performance feedback systems to control the motion of the probe relative to the surface.

The positioning and scanning of the probe is usually accomplished with piezoelectric elements. These devices expand or contract when a voltage is applied to them and typically have sensitivities of a few angstroms to hundreds of angstroms per volt. Scanning is implemented in a variety of ways. Some SPMs hold the probe fixed and attach the sample to the scanning mechanism while others scan the probe. Piezoelectric tubes are commonly used, and are generally capable of generating three dimensional scans. They are mechanically stiff have good frequency response for fast scans, and are relatively inexpensive to manufacture and assemble.

Figure 1:
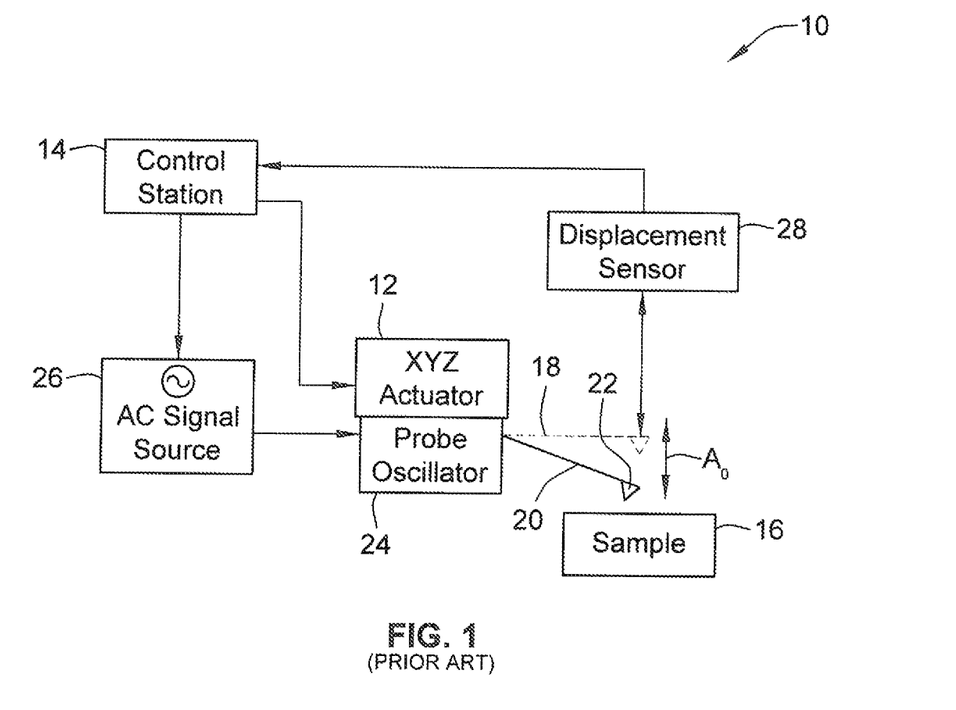
FIG. 1 is a simplified block diagram of AFM appropriately labeled "Prior Art"

FIG. 1 is a simplified block diagram of an exemplary AFM 10. The AFM 10 includes, among other components, an actuator assembly, XYZ actuator assembly or scanner 12, and a controller or control station 14. Control station 14 typically consists of at least one computer and associated electronics and software that perform the tasks of data acquisition and control of the AFM. The control station 14 may consist of a single integrated unit, or may consist of a distributed array of electronics and software. The control station may use a typical desktop computer, a laptop computer, an industrial computer and/or one or more embedded processors.

The scanner 12 is mounted over a sample 16 in this case and bears a probe 18 on its lower, moving end. Probe 18 has a cantilever 20 and a probe tip 22 mounted on the free end portion of the cantilever 20. Again, in some cases, the probe tip 22 is positioned by the piezoelectric scanner 12 over a stationary sample 16; or, in some cases, the sample 16 is attached to the scanner 12 and the tip 22 is stationary. The probe 18 is coupled to an oscillating actuator or drive 24 that is used to drive probe 18 to oscillate at or near the probe's resonant frequency. Commonly, an electronic signal is applied from an AC signal source 26 under control of the AFM control station 14 to the drive the AC signal source 26 to oscillate probe 18, such as at a flee oscillation amplitude $A_o$. The control station 14 acquires data from the sensing device 28 and through feedback controls the height of the tip 22 by applying control voltages to the scanner 12. The sensing device or detector 28 senses tip deflection. The x and y positions are controlled by applying voltages to the scanner through x and y drivers. Typically for most applications, a raster scan is generated by producing a linear motion in the x and y scan directions. The scan area can be offset by starting the raster from a selected position within the scanner range. The probe tip 22 in this arrangement can be positioned anywhere in x and y within the range of the scanner.

In operation, as the probe 18 is oscillated and brought into contact with sample 16, sample characteristics can be monitored by detecting changes in the oscillation of probe 18. In particular, a beam of light is directed towards the backside of probe 18 which is then reflected towards detector 28, such as a four quadrant photodetector. As the beam translates across the detector, appropriate signals are transmitted to control station 14 which processes the signals to determine changes in the oscillation of probe 18. Control station 14 generates control signals to maintain a substantially constant force between the tip 22 and the sample, typically to maintain a setpoint characteristic of the oscillation of probe 18. For example, control station 14 is often used to maintain the oscillation amplitude at a setpoint value to insure a generally constant force between the tip 22 and the sample 16. In other cases, a setpoint phase or frequency is used. The data collected by the control station 14 is typically provided to a workstation that manipulates the data obtained during scanning to perform the point selection, curve fitting, distance determining operations, and other functions. For some AFMs, the workstation is the control station. For other AFMs, the workstation is a separate on-board controller, a separate off-board controller, or any combination of the three.

In existing microscopes, drift of the probe tip across the sample is a significant effect. The drift can distort the image and can make it difficult to continue imaging the same feature over time. Typically, drift in the x-y plane is several angstroms per minute after the set-up has stabilized. Drift can be much greater when a sample is first contacted, sometimes requiring several hours of stabilization before accurate scanning can occur. Drift is due to thermal expansion of the piezoelectric scanner as well as the sample itself and its holder. Additional drift contributions due to "creep" and hysteresis of the piezoelectric material are often present but drift due to thermal expansion is typically the most pronounced. Some drift, such as the drift due to thermal effects, are long-term and are typically constant over the scanning of single images. Drift present when imaging with a scanning probe microscope can restrict its ability to dwell on atomic dimension features, which is useful for monitoring local processes or acquiring repeated images of unique structures. Drift also can cause inordinately long stabilization times before undistorted images can be acquired for larger images.

Many existing designs attempt to reduce the drift by controlling the position of the probe during the scanning process. Other attempts to reduce drift include matching thermal coefficients for probe materials or using superstructure materials that are primarily susceptible to thermal effects, such as drift, and thus, are very stable. For instance, Invar®, a steel alloy, is a registered trademark of Imphy Alloys of Puteaux, France. Invar is commonly used in the construction of AFMs to minimize thermal drift. While Invar will become heated during a scan, the Invar steel alloy will not expand and therefore not drift.

More specifically, Invar is a nickel steel alloy that has a low coefficient of thermal expansion. As a result, it is commonly used in the construction of scientific instruments. While Invar has certain characteristics, such as a low coefficient of thermal expansion, that make it well suited for AFMs, Invar is not widely available and thus is costly. This cost can make purchase and use of instruments such as AFMs impracticable. A cost effective, low drift AFM solution was desired.

SUMMARY OF THE INVENTION

The present invention is directed to a scanning probe microscope, such as an AFM, having a bridge and z-stage substantially free of Invar®. In one embodiment, the bridge and z-stage are comprised of aluminum. In another embodiment, the bridge and z-stage are comprised of steel. The invention utilizes a drift control method whereby the bridge and the z-stage are purposely and controllably heated to an elevated temperature to reduce thermal drift during scanning. For example, the bridge and z-stage can be heated to an elevated temperature so that ambient temperature changes, such as those caused by operation of the scanner, do not change the temperature of the bridge and z-stage. That is by holding the bridge and z-stage substantially constant elevated temperatures, any changes in ambient temperature will not cause the temperature of the bridge and z-stage to change significantly, if at all.

In accordance with one aspect of the invention, heating elements in the form of resistors are thermally coupled to the bridge and the z-stage and a temperature control system is provided that controls the amount of heat imparted onto the bridge and the z-stage. As noted above, in one preferred embodiment, the bridge and the z-stage are formed of aluminum, which is known to be an excellent thermal conductor and much more cost-effective material than Invar® steel alloy. As such, the heat generated by the heating elements is quickly and efficiently conducted throughout the bridge and the z-stage.

In one embodiment of the invention, the temperature of the bridge and the z-stage are separately controlled using separate heating elements and controllers. Ambient sensors are used to provide temperature feedback to the controllers to regulate heating of the bridge and the z-stage.

In accordance with another aspect of the invention, a thermal control method is used to maintain the temperature of the bridge and the z-stage at relatively constant levels to reduce wait time at the onset of a scanning iteration. The control method includes heating the bridge and the z-stage to an elevated temperature and then actively controlling the heating elements to maintain the temperatures of the bridge and the z-stage at the elevated temperatures. When the bridge and the z-stage are initially heated, significant thermal drift may occur and may take hours to stabilize. Accordingly, the control method observes a stabilization period during initial heating of the bridge and the z-stage, but thereafter provides continuous thermal control to avoid observance of the stabilization period before each scan is commenced.

In accordance with another aspect of the invention, the AFM is constructed such that the probe is substantially centered on the bridge in the x-axis, and is slightly off centered in the y-axis. The probe is spaced slightly forward of the bridge which accounts for it being off centered in the y-axis. The (near) symmetry of the probe, i.e., center placement of the probe relative to the bridge in both the x and y axes, also reduces drift.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DESCRIPTION OF THE DRAWINGS

Preferred exemplary embodiments of the invention are illustrated in the accompanying drawings in which like reference numerals represent like parts throughout.

In the drawings.

DESCRIPTION OF THE PREFERRED EMBODIMENTS

Figure 2:
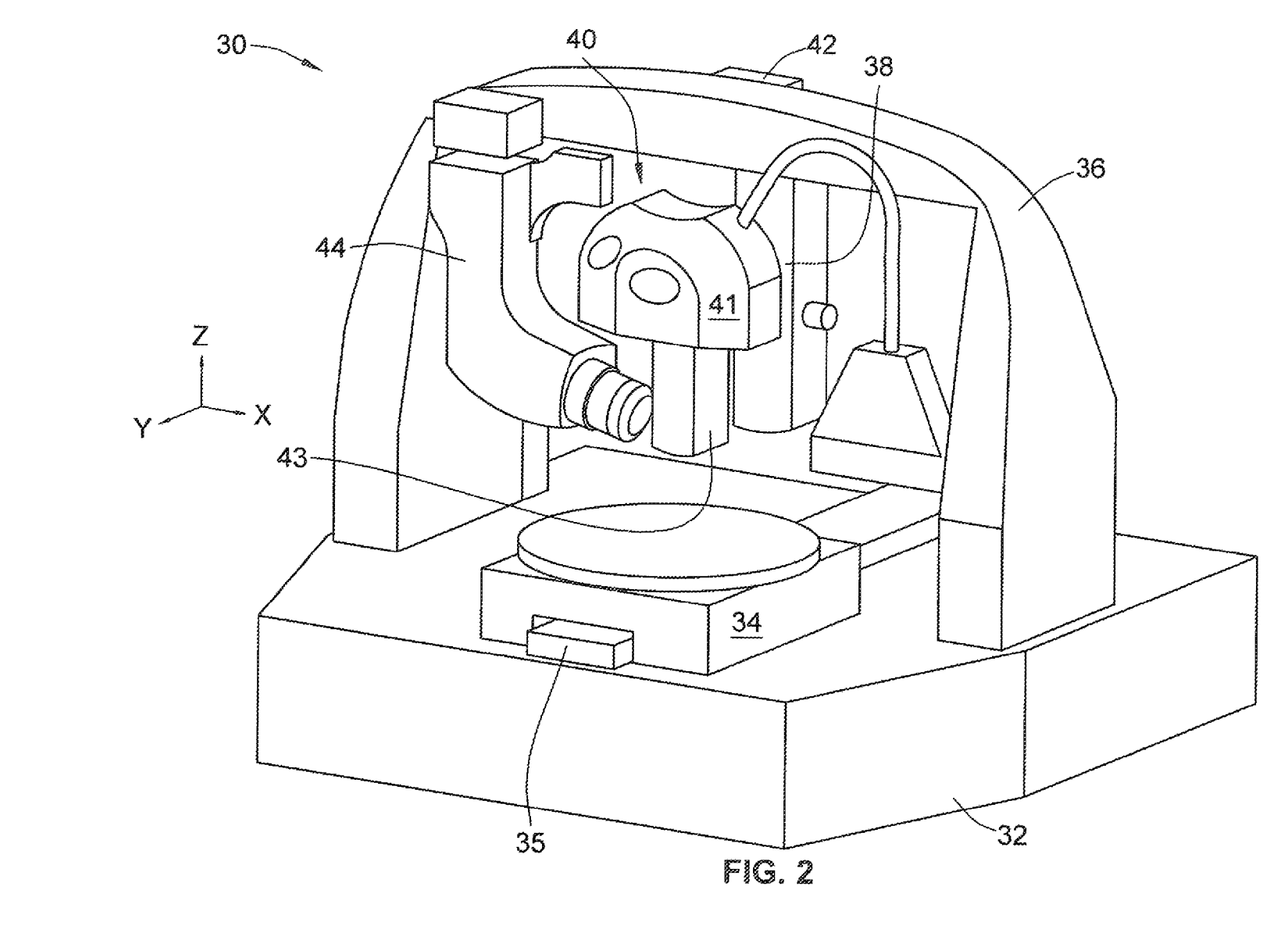
FIG. 2 is a front elevation view of an AFM according to one embodiment of the invention.

Turning now to FIG. 2, an AFM 30 according to one embodiment of the present invention is shown. The AFM 30 includes a block 32 made of granite or similar material, which supports a chuck base 34 and a bridge 36. A z-stage 38 is mounted to the bridge 36 and supports a head 40. As known in the art, the head 40 may include the probe and probe holder (e.g., in the scanning tip design), such as probe 18 described with respect to FIG. 1. More particularly, head 40 supports a housing 41 that supports control electronics and, in this case, a piezoelectric tube actuator 43 that extends orthogonally to a sample placed on chuck base 34. When a scanning probe or tip design is employed, piezoelectric tube actuator 43 supports the probe device (18 shown in FIG. 1) that is used to interact with the sample surface.

A motor 42 is supported by a backside of the bridge 36 and is operable to raise and lower the head 40 to control the position of the probe tip relative to the sample, which sits on a slide (not shown) supported by chuck base 34. An optical microscope 44 is also mounted to the bridge 36 and is operative to acquire optical image data of a sample placed on the chuck base 34, e.g., for probe-sample engagement. As best shown in FIG. 2, the head 40 is mounted to the z-stage 38 and the z-stage 38 is supported by the bridge 36 such that the probe 18 and tip 22 are centered horizontally (in the x-axis) relative to the bridge 36. This symmetry helps reduce drift of the tip 22, especially along the x-axis. In this case, chuck base 34 is formed to accommodate a tail 35 allowing base to be moved relative to head 40, e.g., for loading and unloading samples.

In contrast to conventional AFMs, bridge 36 and the coarse z-stage 38 are formed of aluminum rather than Invar. In an alternate embodiment, the bridge 36 and z-stage 38 formed of steel. Aluminum and steel are more readily available than Invar and thus are generally less costly, which provides a more affordable AFM. One of the drawbacks of aluminum and steel is that they have a coefficient of thermal expansion that is significantly higher than that of Invar. Aluminum has a coefficient of thermal expansion (CTE) of $23.0 \times 10^{-6}$ and steel has a CTE of about half that of aluminum, or about $12.0 \times 10^{-6}$. In contrast, Invar has a CTE of $1.2 \times 10^{-6}$. Since aluminum and steel have higher CTE values, a bridge and z-stage made of aluminum or steel is more susceptible to thermal drift. In fact, prior to now, AFM providers have not offered an AFM employing a superstructure made of a material having such a high CTE.

Figure 3:
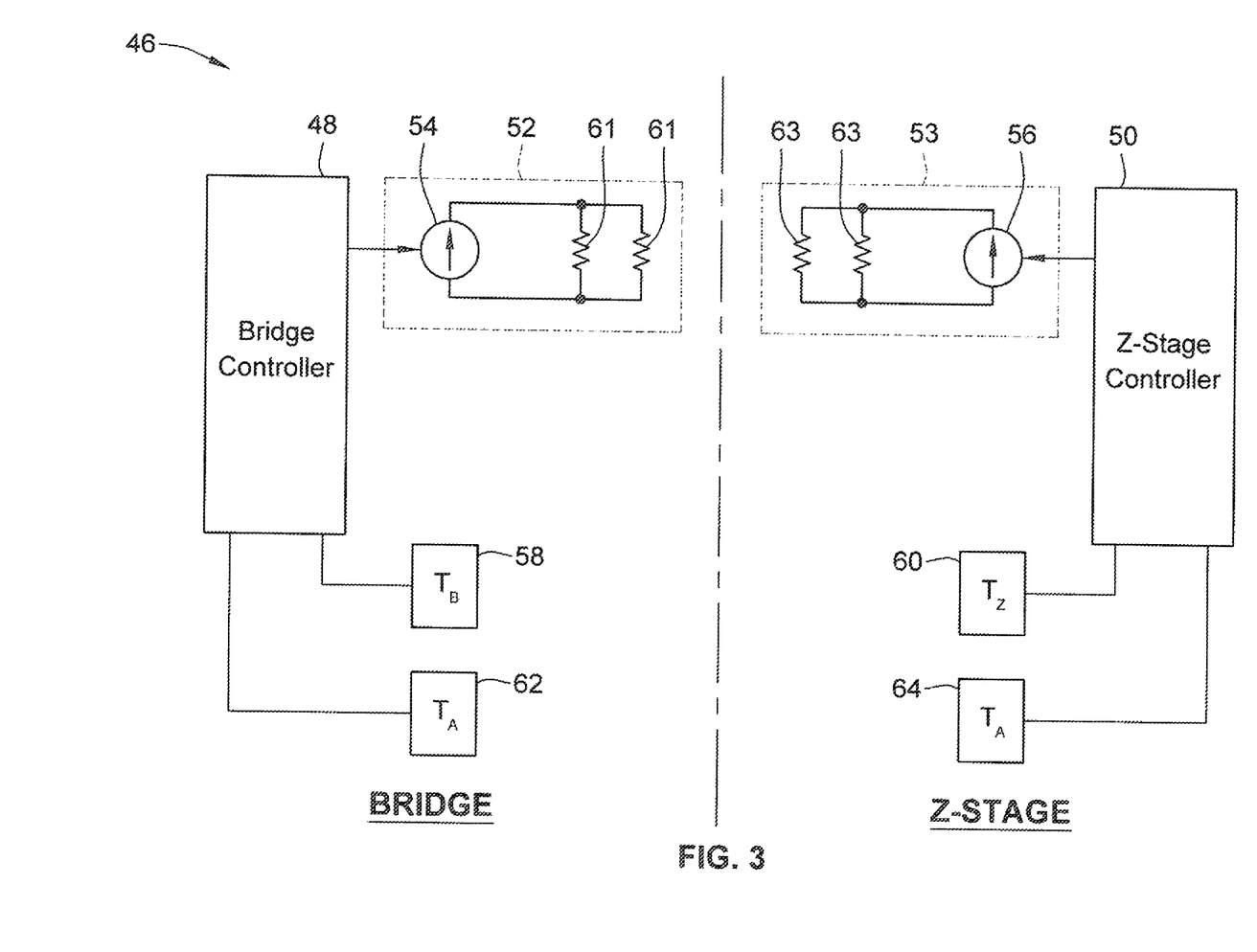
FIG. 3 is a block diagram of a thermal control system for controlling drift in the AFM shown in FIG. 2 according to another embodiment of the invention.

Accordingly, the present invention also provides a drift compensation system 46 to negate the drift that would otherwise occur with an AFM having a bridge and/or z-stage made of aluminum, steel, or other material substantially free of Invar or similar material. The drift compensation system 46 is schematically shown in FIG. 3. The thermal control system 46 includes a pair of controllers 48, 50, heating circuits 52, 53, current sources 54, 56, and temperature sensors 58, 60 (bridge and z-stage, respectively), in a preferred embodiment, the heating circuits 52, 53 have resistive heating elements 61, 63 respectively, that are thermally coupled to the bridge and the z-stage and emit heat when current is conducted therethrough. This heat is then transferred to the bridge and the z-stage for heating thereof. The control system 46 also includes ambient temperature sensors 62, 64 that provide ambient temperature information to the controllers 48, 50, respectively. Alternately, a single ambient temperature sensor could be used to provide ambient temperature information to both controllers 48, 50. In another alternate embodiment, a single controller is used to control heating of the bridge and the z-stage.

Figure 4:
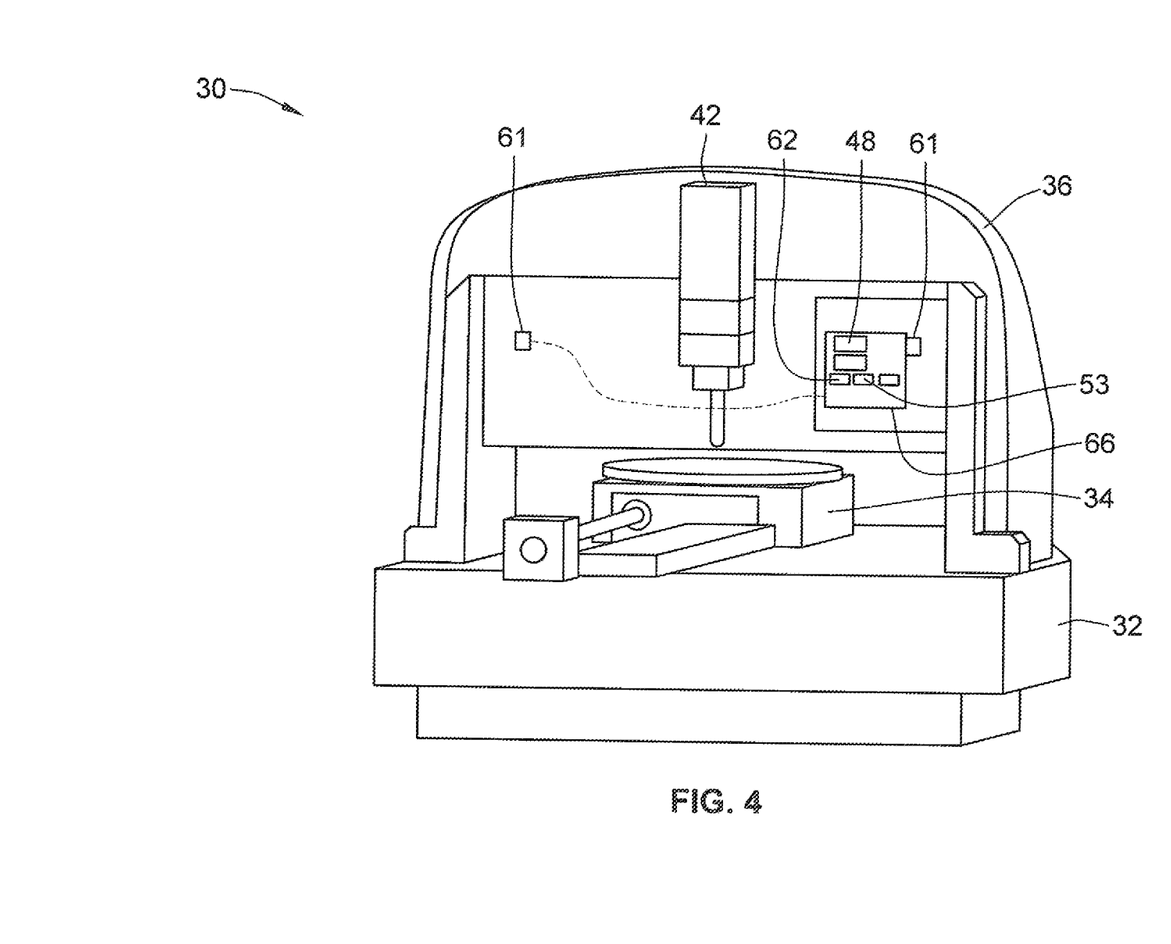
FIG. 4 is a rear elevation view of the AFM shown in FIG. 2 with a rear plate removed to expose the back surface of the bridge.
Figure 5:
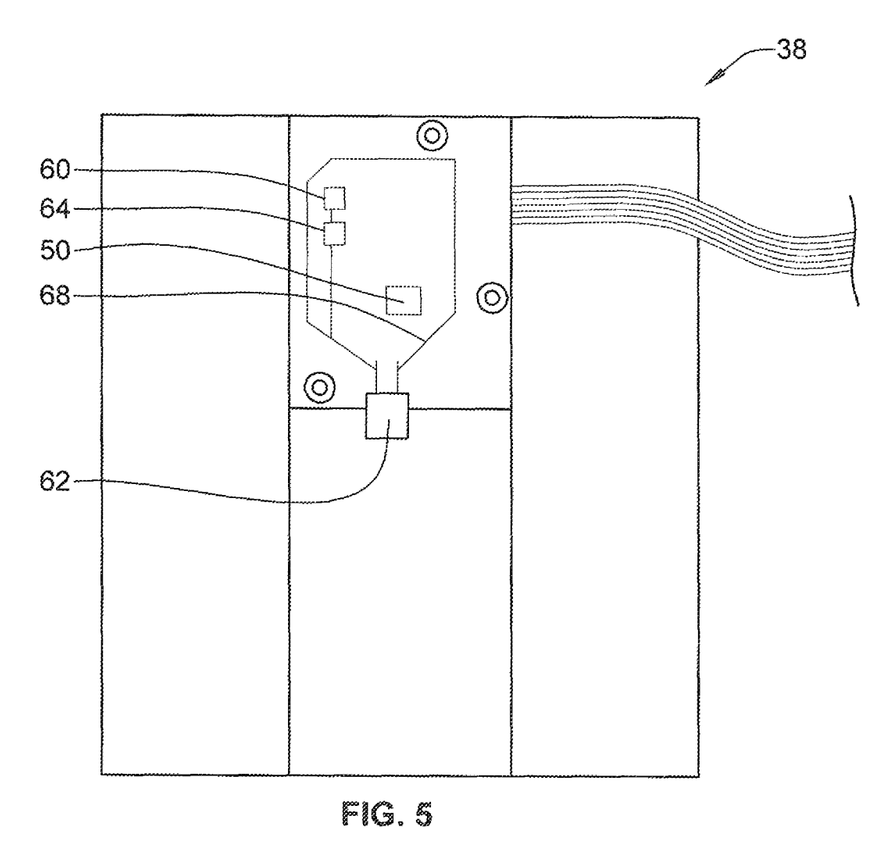
FIG. 5 is a rear elevation view of the z-stage of the AFM shown in FIGS. 2 and 4.

FIG. 4 is a rear view of the AFM 30 with a rear plate removed to show placement of the bridge heating elements 61 and controller 48 against the back surface of the bridge 36. The heating elements 61 are preferably bonded to the bridge 36 using a known thermally conductive adhesive. The microprocessor 48, ambient temperature sensor 62, and bridge heating circuit 53 are mounted to a printed circuit board 66 that is coupled to the bridge 36. The printed circuit board 66 is preferably thermally insulated from the bridge 36 to minimize transfer of heat generated thereby during operation of the bridge. Bridge temperature sensor 58 is preferably located (e.g., the bridge is tapped so the sensor may be screwed thereto) so it is substantially centered at the midpoint of bridge 36 (e.g., adjacent or near motor 42). The z-stage heating elements 63 are similarly mounted to the backside of the z-stage 38, as shown in FIG. 5. As further shown in FIG. 5, the controller 50 and the ambient temperature sensor 64 are preferably mounted to a printed circuit board 68 that is mounted to the z-stage 38. The z-stage temperature sensor 60 is preferably a surface mounted sensor that, again, is essentially centered (e.g., vertically) on the z-stage and coupled thereto (for example, the stage is tapped so the surface mounted sensor can be screwed to the stage). It will be appreciated that having separate controllers allows the temperature of the bridge and the z-stage to be independently controlled. Additionally, as the piezoelectric scanner heats up, the z-stage 38 will warm more quickly than the bridge. Thus, in many instances, the bridge will be more actively heated than the z-stage. Nonetheless, it is contemplated that a single controller could be used to control heating of the bridge and the z-stage. In one case, the controller hardware is on the same PCB board, but two separate feedback loops are employed to effectuate the control.

Figure 6:
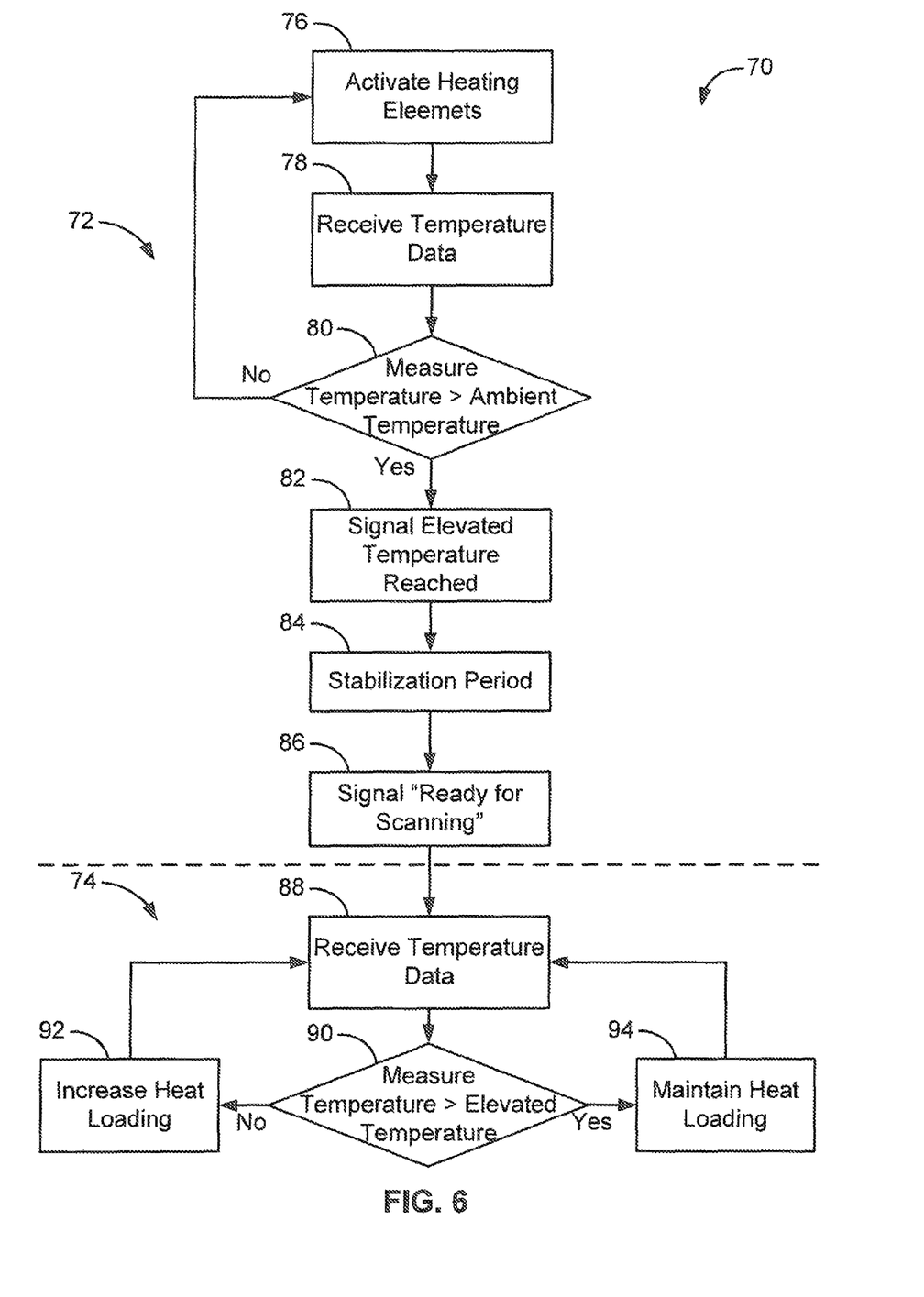
FIG. 6 is a flow diagram of a method of minimizing drift in an AFM, according to a preferred embodiment.

A flow diagram illustrating a method 70 of minimizing drift in an AFM according to a preferred embodiment is set forth in FIG. 6. As will be described in more detail, the thermal control system 46 is operative to heat the bridge 36 and the z-stage 38 to an elevated temperature and hold the bridge 36 and the z-stage 38 at about that elevated temperature. The bridge 36 and z-stage 38 are heated to a setpoint temperature that in one embodiment is greater than room temperature. The setpoint temperature is selected to be a temperature that can be stably maintained over time, for example, days. In one preferred embodiment, in which the ambient temperature ranges from about 21-23 degrees Celsius, the setpoint temperature is set to at least about 25° C., and in this regard the setpoint temperature is set based on the ambient temperature. Notably, the setpoint temperature should not be set too high given that the higher the temperature, the easier that temperature is to inadvertantly modulate, for example, by changing environmental factors (e.g., someone walking by the instrument). In this case, if the ambient temperature exceeds 25° C. the setpoint may manually be adjusted. Alternatively, such a condition be monitored and automatically adjusted. One way to do so is to monitor the feedback. If feedback operates to reduce the delivered power to zero (e.g., no heating may be required if ambient exceeds 25° C., in this case), the system knows that the setpoint temperature has been exceeded. At that point, the setpoint may be adjusted to maintain bridge temperature above ambient, thereby minimizing drift.

By raising the bridge 36 and the z-stage 38 to an elevated temperature, the adverse thermal drift effects due to ambient temperature changes are substantially reduced. This is particularly well illustrated in FIGS. 7 and 8 discussed below. Ideally, the thermal control system is employed to maintain a temperature above ambient due to the fact that temperature changes at higher temperatures typically exhibit less adverse thermal drift effects. Overall, in the preferred embodiments, stable temperature is maintained to minimize drift. To do so effectively, temperature must be increased slowly. If the setpoint is changed substantially instantly, the operator will need to let the instrument stabilize (e.g., two to three hours) prior to AFM operation. Notably, a change of 1° C. over a day will yield small drift—and heating as described herein may not be required.

Accordingly, in a preferred embodiment, control method 70 includes an initialization stage 72 and a scanning stage 74. In the initialization stage 72, the heating elements for the bridge 36 and the z-stage 38 are activated at Block 76, i.e., the system causes electrical current to flow through heating elements 61 and 63 (e.g., resistive heating elements), respectively. As the heating elements heat the bridge 36 and the z-stage 38, temperature data including the temperatures of the bridge 36 and the z-stage 38 is provided to the controllers 48 and 50, respectively, from temperature sensors 58 and 60, respectively, at Block 78. The controllers 48, 50 then compare the bridge and z-stage temperature to an ambient temperature provided by temperature sensors 62, 64 at Block 80. If the measured temperatures of the bridge and the z-stage are less than the ambient temperature plus an offset value, the control method loops back to Block 76 whereby the controllers continue activation of the heating elements. On the other hand, if the measured bridge and z-stage temperatures exceed the ambient temperature plus the offset value, the initialization stage is complete and a suitable indicator, such as illumination of an LED (not shown), is provided to signal a user that the temperature of the bridge and the z-stage are at the desired (i.e., setpoint) elevated temperatures at Block 82.

It will be understood that the controllers may be independent of one another and, as such, each controller independently can control the activation of its corresponding heating elements. In this regard, it is possible for one of the bridge and the z-stage to reach the desired "above-ambient" temperature before the other one of the bridge and the z-stage. In such an instance, it is understood that the LED or other indicator may not be activated until both the bridge and the z-stage have reached the desired temperature.

Additionally, in a preferred embodiment, the controllers heat the bridge and z-stage to a temperature that is elevated somewhat above the ambient temperature so that any changes in ambient temperature have a minimal impact, i.e., little thermal drift. Further, as will be discussed in greater detail with respect to FIGS. 7 and 8, thermal drift can be significant during the initialization stage and for a period thereafter. As such, scanning is preferably not commenced until after thermal drift has stabilized. In this regard, in a preferred embodiment, a "ready to scan signal" is provided at Block 84 only until after expiration of a stabilization period, e.g., 1 to 2 hours. During the stabilization period, however, the controllers continue to receive temperature feedback and activate the heating elements accordingly, as described above, to hold the temperatures of the bridge and the z-stage at or above the elevated temperature.

Once the initialization stage 72 is complete, control method 70 continues to the scanning stage 74. Operation of the controllers in the scanning stage 74 is similar to the initialization stage 72 but rather than raise the temperature of the bridge and the z-stage to an elevated temperature, the controllers operate to hold the temperatures at the setpoint elevated temperature. Accordingly, during a scan, or pauses between scans, temperature data is continued to be provided to the controllers at Block 88. The controllers then compare the measured temperatures of the bridge and the z-stage to the elevated temperatures at Block 90. If the measured temperatures are lower than the elevated temperature, the controllers control the heating elements so that the amount of heat imparted onto the bridge and/or z-stage controller is increased at Block 92. It is envisioned that the heating elements, once activated at Block 76, will be controlled to heat the bridge and the z-stage constantly throughout the initialization and scanning stages 72, 74, but the amount of heat applied may vary. If the temperatures of the bridge and the z-stage are at or above the elevated temperatures, the controllers maintain the heat loading provided by the heating elements at Block 94. In either case, this active thermal control is provided throughout the duration of the scanning session.

In a preferred embodiment, once the initialization stage has been executed, the steps of the scanning stage 74 are carried out even when the AFM is not being used to scan. Doing so avoids the relatively lengthy stabilization period and thus makes the AFM usable at a moments notice. It is understood however that if there will be significant periods of time between scan sessions, the AFM and the thermal control system described herein may be shut-off. However, once the AFM is powered back up, the initialization stage will need to be repeated together with observance of the stabilization period.

Figure 7:
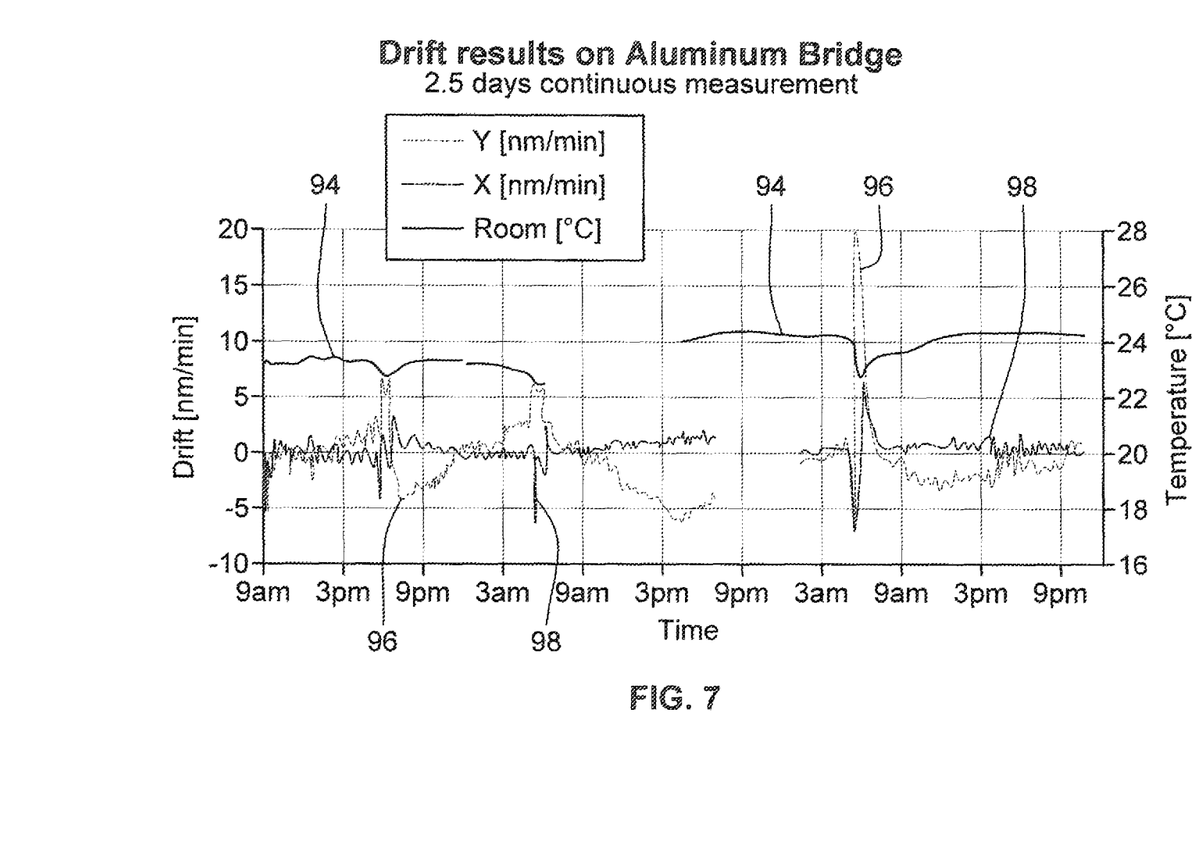
FIG. 7 is a chart showing drift that was measured over a two and one-half day measurement period of an AFM of the present invention without implementation of the thermal control system of the present invention.

FIG. 7 shows drift measured over a 60 hour period for an AFM having an aluminum bridge without the thermal control system of the present invention. Trace 94 corresponds to ambient room temperature over the measurement period. During the measurement period the ambient room temperature varied between 22 and 25° C. Trace 96 corresponds to drift in the y-axis and trace 98 corresponds to drift in the x-axis. Drift is measured in nanometers per minute.

FIG. 7 also shows that drift with an AFM having an aluminum bridge is significant even in response to small ambient temperature changes. For example, a temperature change of less than 1° C. resulted in less than about 5 nm of drift in the y-axis. A temperature change of approximately 1.5° C. resulted in less than about 20 nm of drift along the y-axis and 10 nm of drift in the x-axis. FIG. 7 also shows that during the measurement period, the drift in the y-axis was more significant than drift in the x-axis. This difference in drift is largely due to the tip being substantially centered in the x-axis direction but spaced from the bridge in the y-axis due at least in part to the extending lever of the probe.

Figure 8:
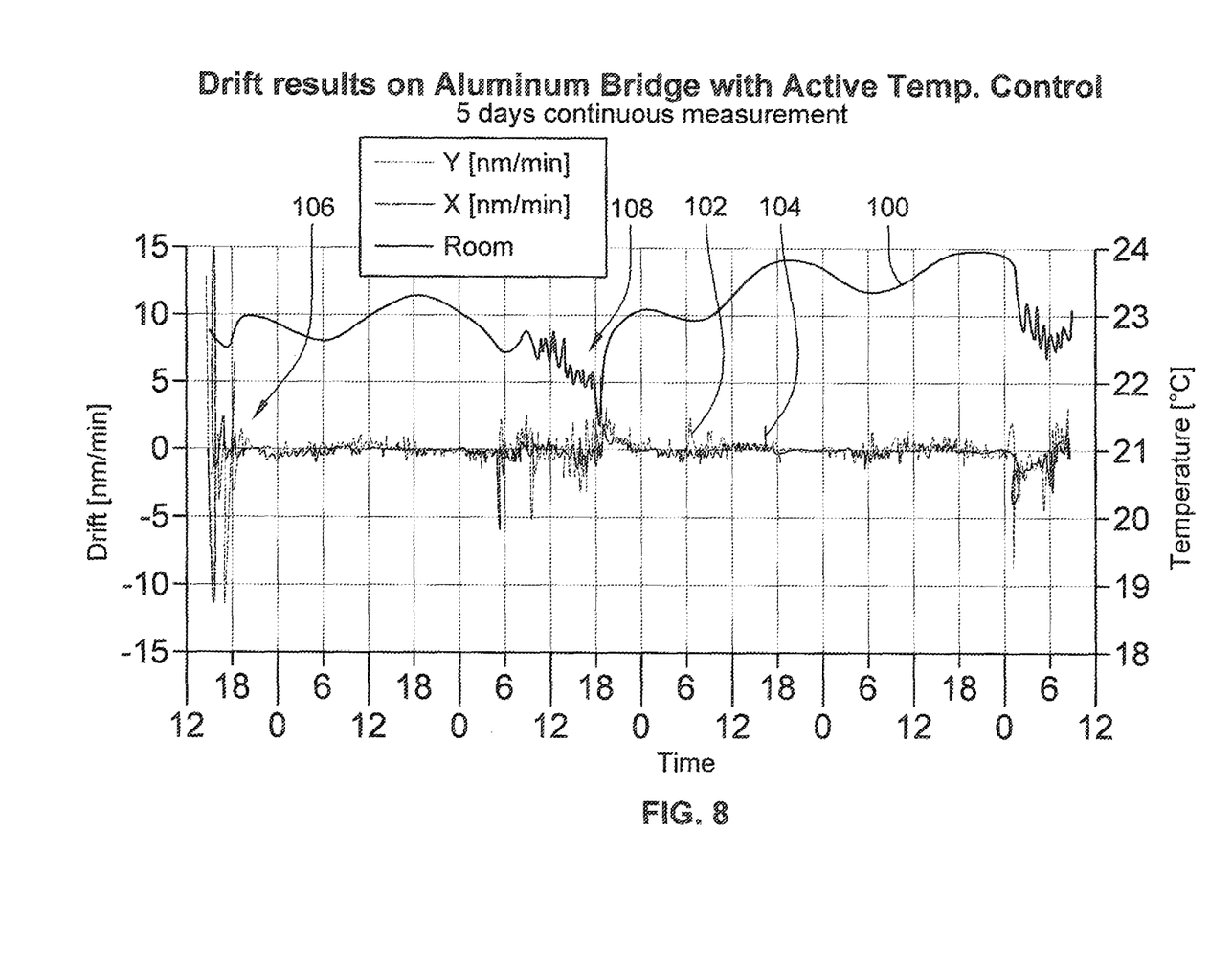
FIG. 8 is a chart showing drift that was measured over a five day measurement period of an AFM according to the present invention having a thermal control system of the present invention.

FIG. 8 shows drift measured over a 5 day period for an AFM having an aluminum bridge and the thermal control system of the present invention. Trace 100 corresponds to ambient room temperature over the measurement period. During the measurement period the ambient room temperature varied between 22° C. and 24° C. Trace 102 corresponds to drift in the y-axis and trace 104 corresponds to drift in the x-axis. Similar to FIG. 7, drift is measured in nanometers per minute. FIG. 8 shows that during a stabilization period, generally designated by reference numeral 106, drift in both x and y was significantly muted compared to the drift that was measured of aluminum bridge without the thermal control system of the preferred embodiments. For example, for a temperature change of approximately 1° C., the measured drift was less than about 1.0 nm. Additionally, when a significant and rapid ambient temperature change was introduced, generally represented at arrow 108, the amount of drift measured along y-axis was still less than 10.0 nm. FIG. 8 also shows that significant drift was measured at the outset of heating the bridge. During this stabilization period, the drift was significant in both the x and y directions. After the stabilization period, however, the amount of measured drift was substantially less. Thus, in a preferred embodiment, the thermal control system of the present invention is operative to control the temperature of the bridge and the z-stage during active scanning as well as those intervals between scans. By controlling the temperature of the bridge and the z-stage well in advance of a scanning session, delaying the scanning or measurement process to wait out a stabilization period, which can be a few hours, can be avoided. More particularly, users are able to keep the control system in continuous operation to avoid waiting for system stabilization, thus providing a true "on-demand" scanning experience.

Additionally, the drift compensation system 46 is structured to control the temperature of the bridge and the z-stage to a thousandth of a degree, i.e., mK or mC control. For example, for a tip that is 5 cm from the center of the bridge, absent drift compensation of the present invention, the tip would drift approximately one micron per degree Celsius change. Thus, to prevent drift of more than about one nanometer, the temperature of the bridge and the z-stage must be controlled to about a thousandth of a degree. Accordingly, the controllers, heating elements, and sensors are configured to provide such precise temperature control. Appropriate PI controllers, resistors and thermistors are provided to yield the desired precision.

As described above, in a preferred embodiment, the bridge and z-stage are comprised of aluminum. While aluminum has a high coefficient of thermal expansion compared to Invar, aluminum, also has a high heat transfer coefficient. The heat applied to the bridge and the z-stage will thus conduct quickly through the aluminum structures.

Additionally, while the bridge and z-stage have been described as being formed of a material substantially free of Invar, such as aluminum or steel, it is also preferred that the chuck base is also made of material substantially free of Invar.

Many changes and modifications could be made to the invention without departing from the spirit thereof. The scope of these changes will become apparent from the appended claims.

We claim:

1. A method of minimizing drift in an atomic force microscope during scanning of a sample, wherein the microscope includes a probe mounted to a support structure formed of a material substantially free of Invar®, the method comprising:
   providing a heating element including at least one resistive element mounted on a printed circuit board that is adhesively bonded to an exterior surface of the support structure;
   pre-heating the support structure with the heating element to a pre-defined temperature, wherein the pre-defined temperature exceeds that of an amount of heat generated in the support structure during scanning the sample;
   monitoring a temperature of the support structure during scanning of the sample; and
   heating the support structure with the heating element during scanning of the sample to maintain the temperature of the support structure substantially at the pre-defined temperature.

2. The method of claim 1, wherein the support structure includes a bridge structure supported by a base, and further comprising heating the bridge structure during scanning of the sample so as to maintain the temperature of the bridge structure within a pre-defined micro-Kelvin of the pre-defined temperature.

3. The method of claim 1, wherein heating the support structure includes passing current through at least one resistive element coupled to the support structure.

4. The method of claim 1, wherein the support structure is comprised substantially of aluminum.

5. The method of claim 2, further comprising a z-axis actuator operative to change a vertical spacing between the sample and the tip, and further comprising providing a thermal control system configured to heat the z-axis actuator prior to scanning of the sample and maintain the z-axis actuator at a second substantially constant temperature during scanning of the sample by the scanner.

6. The method of claim 5, wherein the z-axis actuator is substantially free of Invar®.

7. The method of claim 6, wherein the z-axis actuator is comprised substantially of aluminum.

8. The method of claim 5, wherein the z-axis actuator is coupled to the bridge structure, and further comprising maintaining, with the control system, the pre-defined substantially constant temperatures substantially equal.

9. The method of claim 8, wherein the substantially constant temperature is based on ambient temperature.

10. The method of claim 8, wherein the substantially constant temperature is sufficient to reduce drift between the probe and the sample during scanning.

11. The method of claim 10, wherein the drift is maintained at less than about 1 nm for an ambient temperature change of about 1° C.

\* \* \* \* \*